United States Patent [19]

Valli

[11] 4,036,355
[45] July 19, 1977

[54] EGG ESCALATOR

[76] Inventor: Roberto Valli, Via IV Novembre 1/a, Galatea (Forli), Italy

[21] Appl. No.: 581,049

[22] Filed: May 27, 1975

[30] Foreign Application Priority Data

June 11, 1974 Italy .................................. 12021/74

[51] Int. Cl.² ............................................ B656 19/00
[52] U.S. Cl. .................................... 198/607; 198/688
[58] Field of Search ............... 198/131, 160, 163, 165, 198/179, 198, 607, 688, 728

[56] References Cited

U.S. PATENT DOCUMENTS

| | | | |
|---|---|---|---|
| 2,167,818 | 8/1939 | Wagner | 198/160 |
| 2,447,039 | 8/1948 | Stabler | 198/179 |
| 3,124,231 | 3/1964 | Ott | 198/165 |
| 3,182,808 | 5/1965 | Benoit et al. | 198/198 |
| 3,300,028 | 1/1967 | Landrey et al. | 198/160 |

FOREIGN PATENT DOCUMENTS 1,031,334  6/1966  United Kingdom ................. 198/160

Primary Examiner—Evon C. Blunk
Assistant Examiner—Joseph E. Valenza
Attorney, Agent, or Firm—Bucknam and Archer

[57] ABSTRACT

A roller-driven belt bearing a multitude of closely spaced, readily flexible spikes projecting at right angles from its surface receives between deflected spikes individual eggs for transferral to a different level. A screen closely spaced in front of the spikes prevents the eggs from falling off the spikes.

2 Claims, 4 Drawing Figures

EGG ESCALATOR

This invention relates to an egg escalator, particularly for cooperation with horizontal or quasi-horizontal egg conveyors, for transferring eggs delivered from a conveyor belt at one level to a similar conveyor belt or other equipment on a different level.

The problem of egg transferral between different levels arises in automatic egg laying cage systems, where several tiers of cages of egg-laying hens or other birds are arranged on a plurality of levels, one above the other. Eggs laid by hens lodged in the cages in the several tiers roll along the sloping cage floor and out of the cages onto respective conveyor belts for transport to the respective delivery ends of the conveyor belts and must eventually be transferred to one level for final collection.

In the past, the transferral of the eggs to such final level has been effected either by discontinuous means requiring intervention of human operators, or by means of inclined cleated conveyor belts.

The latter devices, since their inclination can only be very small, are cumbersome and costly, occupy a considerable amount of valuable surface, and moreover, since the eggs tend to roll about on the belt, they often crack or break them.

In a different proposed arrangement, comb-like cradles move through interdigitating comb-like supports mounted at the delivery ends of the conveyor belts. This arrangement requires an exceedingly accurate and therefore costly construction. Moreover, since the eggs can only be picked up by the cradles in their ascending movement and released in their descent, the eggs have to be lifted around the top of the hoisting apparatus, with attendant constructional complications and high cost.

A main object of the invention therefore resides in providing an egg escalator adapted to transfer eggs vertically or quasi-vertically from the output end of a conveyor belt on one level to a different level, be it a lower or an upper one.

A further object of the invention resides in providing an egg escalator as above, in which the likelihood of damage to the eggs handled is minimized.

Thus the invention originates from the necessity of definitely solving the problem of egg transfer. However, it will be understood that the invention can also be used for vertical transfer of any other delicate object of any form or size such as fruit, fragile containers, light bulbs and the like.

The invention achieves the above and other objects by means of an egg escalator for transferring eggs delivered along a surface at one level onto a surface at a different level, comprising: a first roller rotatably supported in a fixed position in front of and higher than the upper of the surfaces; a second roller rotatably supported beneath and parallel to the first roller and directly above the lower of the surfaces; a belt extending around said rollers for driving support therewith, the belt having rigidly connected, closely spaced, resilient projections at right angles to its surface, the projections being at least as long as the average length of an egg, and the distance between any two adjacent projections being less than the average cross-section diameter of an egg; a screen stationarily supported at close distance in front of the belt projections and extending between the surfaces at said levels; driving means connected to at least one of the rollers for driving the belt so that its portion in front of the screen moves from said surface at one level toward said surface at the different level.

The invention is further disclosed in the following detailed description, reference being had to the accompanying drawings, in which.

Figure 1:
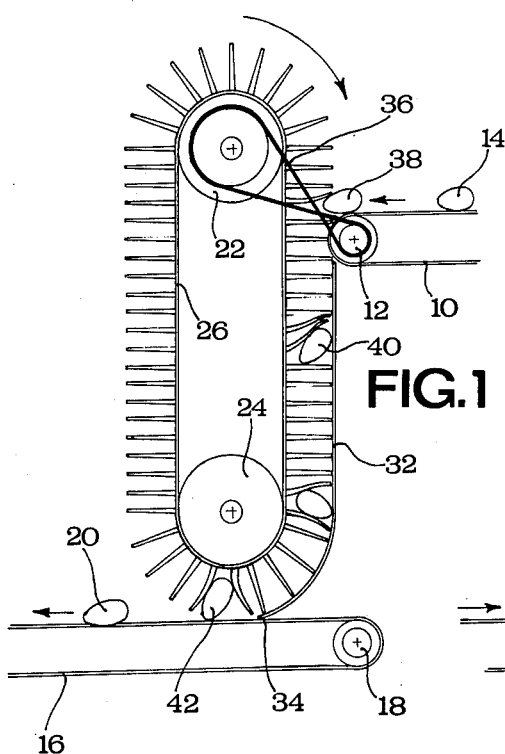
FIG. 1 is a somewhat diagrammatical side view of an egg escalator according to the invention, arranged for downward transferral of the eggs.

In FIG. 1, 10 is a conventional upper conveyor belt supported on rollers such as 12, and carrying eggs such as 14 along a horizontal path toward its tail end. In a typical instance, the eggs would reach the conveyor belt 10 directly from the cages (not shown), as explained above. On the lower level, a further conventional lower conveyor belt 16 driven by rollers such as 18 is adapted to carry eggs such as 20 away to further handling (not shown).

In the area in front of the tail end of conveyor belt 10 and above the infeed end of conveyor belt 16, two rollers 22, 24 are rotatably supported upon frame means not shown, with the axes of rotation of both rollers arranged parallel to the axes of rollers 12, 18 and directly above one another. The upper roller 22 is above the upper level, or the level of upper conveyor belt 10, while the lower roller 24 is above the lower level.

Figure 3:
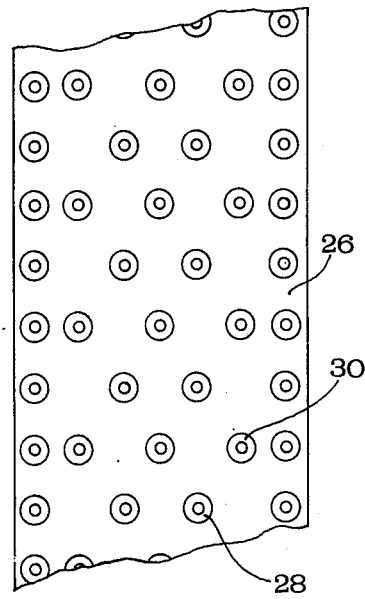
FIG. 3 is a front view of a belt used in the escalator of FIGS. 1 and 2.
Figure 4:
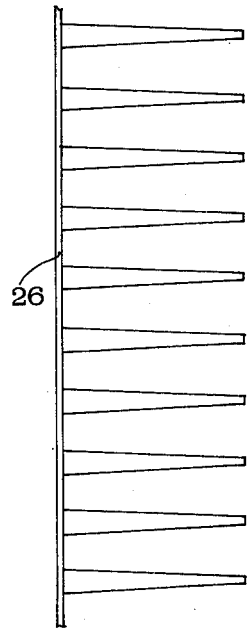
FIG. 4 is a side view of the belt of FIG. 3.

Upon the rollers 22, 24 a closed loop of a belt 26 is drivingly supported. The belt 26, best shown on FIGS. 3 and 4, bears a multitude of closely spaced flexible spikes 28 projecting at right angles from its outside surface, over its entire width. Each spike is about the length of an average egg. The spikes are tapered from the root to the tip, and are made of a readily flexible material, so that they can easily deflect from their normal shape with negligible resistance. The distance between any two adjacent spikes is everywhere less than the average cross-section diameter of an egg.

In a preferred embodiment, the spiked belt 26 is made in one piece from molded rubber and has a thickness of about 3 mm. Each spike is about 60 mm long, has a cross-section of about 8 mm at its root and of about 4 mm or less at its tip. The distance between two typical adjacent spikes 28, 30 is about 23 mm. The resiliency of the rubber used is such that a spike can be readily bent double with one finger, while immediately regaining its original straight shape when released.

The distance of the lower roller 24 from the surface of the lower conveyor belt 16 is such that the tips of the undeflected spikes borne by the spiked belt barely touch the lower conveyor belt in their movement. The distance of the spiked belt 26 from the tail end of the upper conveyor belt 10 is such that the tips of the undeflected spikes barely touch the upper coveyor belt.

In front of the spiked belt 26, and at close distance from the tips of the spikes 28, a screen 32 extends from adjacent conveyor belt 10 down to the surface of conveyor belt 16, curving to follow the spike tips and terminating in an edge 34 close to the surface of conveyor belt 16.

Driving means are provided for rotating one or the other of rollers 22, 24. In FIG. 1, roller 22 is driven, and the driving means are a belt transmission 36 from roller 12, the transmission belt 36 being crossed so as to cause downward movement of spiked belt 26 along the screen 32.

In operation, when an egg 38 carried on the upper conveyor belt 10 reaches its tail end, the egg is lightly pushed by the conveyor belt into and among the spikes 28 of the spiked belt 26, deflecting them so as to nest among them. This action is aided by the downward movement of conveyor belt 10 around roller 12. When the egg, such as egg 40, has cleared conveyor belt 10, it is prevented from falling off the spikes by screen 32, while being supported by the deflected spikes. When an egg, such as egg 42, reaches the lower conveyor belt 16, it is smoothly released from the spikes, due to a number of factors such as its own unchecked weight, the spacing out of the spikes caused by the curvature of the spiked belt, and the pulling action of the conveyor belt.

Figure 2:
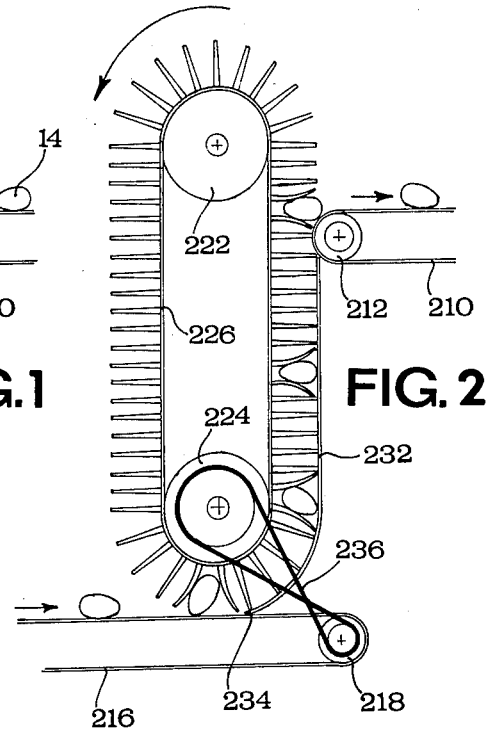
FIG. 2 is a view similar to FIG. 1, where the egg escalator is arranged for upward movement of the eggs.

FIG. 2 shows an arrangement similar to the arrangement of FIG. 1, except that the lower roller for the spiked belt is driven rather than the upper one. Parts in FIG. 2 having a counterpart in FIG. 1 bear the same reference number with a prefix "2". In FIG. 2, the driving power is transmitted to the lower roller 224, preferably from the roller 218 of the lower conveyor belt 216, by means of a belt transmission 236. In this case the spiked belt is driven in a direction opposite to the direction of FIG. 1, i.e. upwardly along screen 232. Also the direction of movement of both conveyor belts 210, 216 is reversed.

Eggs carried toward the spiked belt upon conveyor belt 216 are picked up among deflected spikes 228, with the aid of the edge 234 of screen 232, and are transferred upward and eventually released onto upper conveyor belt 210.

While a preferred embodiment of the invention has been disclosed, it should be understood that the invention is capable of being practiced in a number of different modifications in several features. For instance, although the egg escalator has been shown cooperating with an upper and a lower conveyor belts, the upper conveyor belt could be a different device such as a chute, while the lower conveyor belt could be itself a chute or even a stationary container, such conveyor belts not being part of the invention.

The driving means could be of a different nature than shown, and in particular they could be independent from either conveyor belt, such as a motor drivingly connected to one of the rollers supporting the spiked belt.

Although the spikes of the spiked belt have been described as being integral with the belt web, the web could well be made separately, with the spikes attached by suitable means. Moreover, although the spikes shown are conical, various other shapes, such as cross, square, etc, would be suitable, and even nonsymmetrical ones such as elliptical or diamond, and in fact it is envisaged that even projections in the shape of blades running transversely across the entire width of the belt would achieve the desired result. The several dimensions of the belt and spikes listed above have also, of course, been given by way of example.

I claim:

1. An egg escalator for transfer of eggs delivered along a first powered horizontal conveyor at an upper level onto a second conveyor at a lower level, the path between said conveyors being essentially vertical, comprising: a first roller rotatably supported in a fixed position in front of and higher than the conveyor at the upper level;

a second roller rotatably supported beneath and parallel to the first roller and directly above the conveyor at the lower level;

a belt extending around said rollers for driving support therewith, and defining a path comprising two vertical runs and an upper and lower bend, the belt having rigidly connected, resilient and flexible spiked projections at right angles to its surface, the projections being at least as long as the average length of an egg and being close to each other along the length and the width of said belt whereby each egg is held by at least two projections, each egg deflecting at least two projections and being held by said at least two deflected projections during the transfer; the projections urging each egg away from the belt onto said conveyor at the lower level;

a screen stationarily supported at close distance in front of the belt projections and extending between the two conveyors;

driving means connected to the first roller for driving the belt so that its portion in front of the screen moves from said conveyor at the upper level toward said conveyor at the lower level, said first horizontal conveyor at the upper level force feeding the eggs at a point below the upper bend between the spiked projections of said belt whereby the eggs travel along a vertical path immediately after being fed on the belt without going through the upper bend.

2. An egg escalator for transfer of eggs delivered along a first horizontal conveyor at a lower level onto a second conveyor at an upper level, the path between said conveyors being essentially vertical, comprising:

a first roller rotatably supported in a fixed position in front of and higher than the conveyor of the upper level;

a second roller rotatably supported beneath and parallel to the first roller and directly above the conveyor at the lower level;

a belt extending around said rollers for driving support therewith, and defining a path comprising two vertical runs and an upper and lower bend, the belt having rigidly connected, resilient and flexible spiked projections at right angle to its surface, the projections being at least as long as the average length of an egg, being close to each other along the length and the width of said belt whereby each egg is held by at least two projections; each egg deflecting at least two projections and being held by said at least two deflected projections during the transfer; the projections urging each egg away from the belt onto said conveyor at the upper level;

a screen stationarily supported at close distance in front of the belt projections and extending between the two conveyors;

driving means connected to the second roller for driving the belt so that its portion in front of the screen moves from said conveyor at the lower level toward said conveyor at the upper level; said horizontal conveyor at the lower level feeding the eggs at the lower bend, the eggs travelling from the conveyor at the lower level to the conveyor at the upper level without going through the upper bend, whereby the projections perform the function of pushing the eggs upwardly and at least a portion of the weight of the eggs is borne by the screen until the eggs reach a vertical upward run of the belt.

* * * * *